US010473932B2

(12) United States Patent
Kühne

(10) Patent No.: US 10,473,932 B2
(45) Date of Patent: Nov. 12, 2019

(54) METHOD FOR OPERATING A VIRTUAL REALITY SYSTEM, AND VIRTUAL REALITY SYSTEM

(71) Applicant: AUDI AG, Ingolstadt (DE)

(72) Inventor: Marcus Kühne, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/063,565

(22) PCT Filed: Mar. 12, 2016

(86) PCT No.: PCT/EP2016/000447
§ 371 (c)(1),
(2) Date: Jun. 18, 2018

(87) PCT Pub. No.: WO2017/108144
PCT Pub. Date: Jun. 29, 2017

(65) Prior Publication Data
US 2019/0004315 A1 Jan. 3, 2019

(30) Foreign Application Priority Data

Dec. 22, 2015 (DE) .................. 10 2015 226 581

(51) Int. Cl.
G02B 27/01 (2006.01)
G06F 3/01 (2006.01)
(Continued)

(52) U.S. Cl.
CPC ....... G02B 27/017 (2013.01); G02B 27/0093 (2013.01); G02B 27/0179 (2013.01);
(Continued)

(58) Field of Classification Search
CPC .......... G02B 27/017; G02B 2027/0187; G02B 2027/014; G06F 3/011; G06F 3/012
See application file for complete search history.

(56) References Cited

U.S. PATENT DOCUMENTS 7,761,269 B1 * 7/2010 Kraal ............... G06F 3/011
703/1
2007/0002037 A1 * 1/2007 Kuroki .............. G06T 19/006
345/418
(Continued)

FOREIGN PATENT DOCUMENTS

DE 101 37 841 A1 11/2002
DE 10 2013 021 138 A1 6/2015
(Continued)

OTHER PUBLICATIONS

Charles Murray, "Ford virtual reality" May 15, 2015, https://www.youtube.com/watch?v=grhFOU_mlHw, (Year: 2015).*
(Continued)

Primary Examiner — Koosha Sharifi-Tafreshi
(74) Attorney, Agent, or Firm — Staas & Halsey LLP

(57) ABSTRACT

A virtual reality system displays a virtual motor vehicle from a virtual observation position using virtual reality glasses worn by a person. If the virtual motor vehicle is displayed in an interior view, a height of the virtual observation position is set depending on a height position of the virtual reality glasses detected by a detection device, and depending on the vehicle model of the virtual motor vehicle on display. If the virtual motor vehicle is displayed in an exterior view, the height of the virtual observation position is set depending on the detected height position of the virtual reality glasses but independently of the vehicle model.

20 Claims, 2 Drawing Sheets

(51) Int. Cl.
*G02B 27/00* (2006.01)
*G06T 17/00* (2006.01)

(52) U.S. Cl.
CPC .............. *G06F 3/011* (2013.01); *G06F 3/013* (2013.01); *G06F 3/017* (2013.01); *G06T 17/00* (2013.01); *G02B 2027/0178* (2013.01); *G02B 2027/0187* (2013.01)

(56) References Cited

U.S. PATENT DOCUMENTS

2012/0320034 A1* 12/2012 Baron ................... G06F 17/50 345/419
2013/0147686 A1 6/2013 Clavin et al.
2013/0257686 A1* 10/2013 Baron ................... G06F 3/1454 345/2.2

FOREIGN PATENT DOCUMENTS

DE   10 2014 009 302 A1   12/2015
DE   10 2015 226 581.1     12/2015
WO   PCT/EP2016/000447    3/2016

OTHER PUBLICATIONS

Matthäus, "Audi VR experience—Dimensionssprung", Audi Blog, Feb. 9, 2015, 5 pages.
German Office Action dated Oct. 10, 2016 from German Patent Application No. 10 2015 226 581.1,8 pages.
International Search Report dated May 9, 2016 from International Patent Application No. PCCT/EP2016/000447, 3 pages.
Translation of International Preliminary Report on Patentability dated Jun. 28, 2018 from International Patent Application No. PCT/EP2016/000447, 12 pages.

* cited by examiner

METHOD FOR OPERATING A VIRTUAL REALITY SYSTEM, AND VIRTUAL REALITY SYSTEM

CROSS REFERENCE TO RELATED APPLICATIONS

This application is a U.S. national stage of International Application No. PCT/EP2016/000447, filed on Mar. 12, 2016. The International Application claims the priority benefit of German Application No. 10 2015 226 581.1 filed on Dec. 22, 2015. Both the International Application and the German Application are incorporated by reference herein in their entirety.

BACKGROUND

Described herein is a method for operating a virtual reality system, and a virtual reality system.

A virtual reality system can be used to present a virtual reality, with the presentation and simultaneous perception of the reality in terms of its physical properties in interactive virtual surroundings that are generated by computer in real-time usually being referred to as virtual reality.

Virtual reality systems may have a virtual reality headset for displaying virtual surroundings. A virtual reality headset is a specific form of a so-called head-mounted display, which is a visual output device that is worn on the head. It presents images on a screen that is close to the eye or projects the images directly onto the retina. Here, a virtual reality headset has sensors for capturing the movement of the head as well. Hence, the display of calculated graphics can be adapted to the movements of a wearer of the virtual reality headset. As a result of the proximity to the body, the displayed screen areas of head-mounted displays appear substantially larger than the freestanding screens and, in an extreme case, even cover the entire field of view of the user. Since respective displays of virtual reality headsets follow all head movements of the wearer as a result of being held on the head, the wearer has the impression of moving directly in a visual landscape produced by a computer.

By way of example, a virtual reality headset can be used to display various virtual vehicle models. The realistic presentation of virtual objects, such as virtual motor vehicles, for example, presents a particular challenge.

SUMMARY

Described herein is a method for operating a virtual reality system and a virtual reality system, by which a realistic presentation of a virtual motor vehicle can be obtained.

In the method described herein for operating a virtual reality system, a virtual motor vehicle is displayed from a virtual observation position by a virtual reality headset worn by a person. If the virtual motor vehicle is displayed in an interior view, a height of the virtual observation position is predetermined depending on a height position of the virtual reality headset, captured by using a capture device, and depending on the vehicle model of the displayed virtual motor vehicle. If the virtual motor vehicle is displayed in an exterior view, the height of the virtual observation position is predetermined depending on the captured height position of the virtual reality headset and independently of the vehicle model.

The height of the virtual observation position should be understood to refer to the vertical orientation of the virtual observation position within virtual surroundings displayed by using the virtual reality headset, within which the displayed virtual motor vehicle is arranged. By way of example, the virtual observation position can be specified in a Cartesian coordinate system, with the height in that case then being able to be specified by a value for the vertical axis of the coordinate system.

Should the virtual motor vehicle be displayed in the exterior view, the virtual surroundings and the virtual motor vehicle arranged therein are displayed as if the person wearing the virtual reality headset were standing on a virtual inspection area in the displayed surroundings, for example. Should the virtual motor vehicle be displayed in the interior view, the virtual surroundings and the virtual motor vehicle arranged therein are displayed as if the person wearing the virtual reality headset were sitting on the driver's seat of the displayed virtual motor vehicle, for example.

The method described herein renders it possible to present a virtual motor vehicle particularly realistically, for example in an interior view. This is because, in the interior view, it is not only the height position of the virtual reality headset worn by the person, and hence also the height position of the eyes of the wearer of the virtual reality headset, that is taken into account, but also the currently displayed vehicle model. The method is based on the insight that different vehicle models can have different heights. By way of example, the ride position in a sports car is usually relatively low, whereas the driver has a very high ride position in an all-terrain vehicle. The height of the virtual observation position, from which the wearer of the virtual reality headset can observe the virtual motor vehicle in the interior view, is therefore adapted in a vehicle-specific manner—depending on the displayed vehicle model. Thus, should the wearer of the virtual reality headset be seated virtually in the interior of a very low vehicle, the virtual ride height is adapted to the low ride position of the relevant vehicle. Should the wearer of the virtual reality headset, by contrast, sit virtually in a very high vehicle, for example in a very large all-terrain vehicle, the virtual ride height is selected to be substantially higher than in the case where the wearer of the virtual reality headset sits in a very low sports car.

By way of example, should the vehicle model be changed while the virtual motor vehicle is displayed in an interior view, the height of the virtual observation position is adapted automatically to the change in vehicle model. By way of example, should the wearer of the virtual reality headset initially sit in a virtual all-terrain vehicle and should a virtual sports car subsequently be displayed, likewise in the interior view, a floor region of the relevant virtual motor vehicle, for example, is lifted by adapting the height of the virtual observation position such that the virtual ride situation in the sports car is displayed in a credible and realistic manner. Consequently, the wearer of the virtual reality headset sits substantially lower in the virtual sports car than in the virtual all-terrain vehicle. Thus, for example, respective driving pedals are displayed further away or closer to the wearer of the virtual reality headset in the vertical direction, corresponding to the height of the virtual observation position adapted to the respective vehicle model. The same applies, for example, to the case where, in the interior view, the wearer of the virtual reality headset looks to the outside—i.e. into the displayed virtual vehicle surroundings—from the virtual motor vehicle. Depending on the currently displayed vehicle model, the virtual vehicle surroundings are observed from higher up or lower down. Thus, the method described herein renders it possible to present a virtual motor vehicle in a realistic manner in an interior view.

For example, only the captured height position of the virtual reality headset that is decisive as soon as the virtual motor vehicle is displayed in an exterior view, and so, from the outside, e.g. a particularly tall person has a corresponding virtual view of the virtual motor vehicle from higher up from the outside than a particularly short person, for example. Consequently, a particularly realistic display of the virtual motor vehicle is likewise facilitated in the exterior view since this display is adapted to the height of the wearer of the virtual reality headset.

An advantageous embodiment of the method described herein provides for the height of the virtual observation position, from which the virtual motor vehicle is displayed in the interior view, to be predetermined by virtue of a value for a height offset, predetermined depending on the currently displayed virtual motor vehicle, being added to the captured height position of the virtual reality headset. By way of example, a wide variety of vehicle models can be saved in a storage medium of the virtual reality system, with respective values for the height offset being stored for the respective vehicle models. Depending on which of the vehicle models is currently displayed in an interior view by using the virtual reality headset, the correspondingly saved height offset is selected and added to the captured height position of the virtual reality headset. Here, this height offset can be both a positive or a negative value. Thus, expressed differently, the height of the virtual observation position emerges as the sum of the captured height position of the virtual reality headset and the added height offset. As a result, a vehicle-model-specific adaptation of the height of the virtual observation position when displaying the relevant virtual motor vehicle in the interior view can be obtained in a particularly simple manner.

A further advantageous embodiment of the method described herein provides for the value for the height offset to be predetermined by virtue of forming a difference between a height value of the driver's seat of the displayed virtual motor vehicle and a height value of a seating area on which the person is seated. In order to be able to look at the virtual motor vehicle in a particularly comfortable manner in the interior view, provision can be made for the person to be able to sit down on the real seating area. By way of example, this seating area can be a chair, a bench or the like, which for example has an ergonomically comfortable seating height, for example 45 cm. Should the virtual reality headset now display a virtual motor vehicle that has a lower seat position in the interior view than the real seating area, a negative value arises for the value of the height offset since the value for the height offset is formed by virtue of forming a difference between the height value of the vehicle seat of the relevant virtual motor vehicle displayed and the height value of the seating area on which the person is seated. As a result, a wide variety of height values can be saved in a memory device for different vehicle seats of different vehicle models, for example, and so the corresponding height values can be retrieved depending on the selected vehicle model. By way of example, the height value of the real seating area can likewise be stored in this memory device. Should the seating area on which the person can sit down be height-adjustable, a measuring device or a capture device can be provided in the seating area, for example, by which the height value of the seating area is capturable in the case of an adjustment of the seat height of the seating area. As a result, the fitting height values for the relevant seating area can be provided at all times, and so the value for the height offset can be reliably ascertained at all times.

According to a further advantageous embodiment of the method described herein, provision is made for the virtual motor vehicle to be displayed in the interior view for as long as the person is captured sitting on the seating area and for a change from the interior view to the exterior view to be carried out by using the virtual reality headset as soon as the person is captured no longer sitting on the seating area such that, after the change, the virtual motor vehicle is displayed in the exterior view. For example, the interior view is gradually faded out and the exterior view is subsequently gradually faded in when changing from the interior view to the exterior view. This is advantageous against the background that the height of the virtual observation position can change during the change from the interior view to the exterior view, because it is for example only the captured height position of the virtual reality headset that is taken into account in the exterior view when predetermining the height of the virtual observation position. Further, this prevents the person wearing the virtual reality headset from virtually bumping into e.g. the roofliner of the currently displayed virtual motor vehicle since the virtual motor vehicle is no longer displayed in the interior view as soon as the person gets up from the seating area, but in the exterior view instead.

In a further advantageous configuration of the method described herein, provision is made for a change back to the interior view to be carried out by using the virtual reality headset as soon as the person is captured sitting back down on the seating area. Thus, displaying the relevant virtual motor vehicle in the interior view again can easily be caused by the person by virtue of simply sitting back down on the seating area.

A further advantageous embodiment of the method described herein provides for the change back to the interior view only to be carried out once the person has also undertaken a predetermined confirmation action. By way of example, the person can hold a remote control with a button in their hand, with the change back to the interior view only being carried out once this button has been pushed after the person has sat back down in the seating area. Indeed, it could be the case that the person would also like to have the virtual motor vehicle displayed in the exterior view while seated. This is possible as a result of the change back to the interior view only being carried out once the person has undertaken the predetermined confirmation action as well.

According to a further advantageous embodiment of the method described herein, provision is made for a seat occupancy sensor system arranged at or in the seating area to be used to capture whether the person is sitting in the seating area. As a result, whether or not the person is currently seated in the seating area can easily be determined, and so the virtual reality headset can be actuated according to the signals provided by the seat occupancy sensor system in order to display the virtual motor vehicle either in the interior view or in the exterior view.

The virtual reality system according to the disclosure may include a virtual reality headset, a capture device for capturing a height position of the virtual reality headset and a control device that is configured to actuate the virtual reality headset according to the method described herein. Here, advantageous configurations of the method described herein should be considered to be advantageous configurations of the virtual reality system described herein, with the virtual reality system carrying out the operations of the method described herein, for example.

Further advantages, features and details of the disclosure emerge from the following description of example embodiments, and on the basis of the drawings. The features and feature combinations disclosed in the description above and the features and feature combinations disclosed in the description of the drawings below and/or only shown in the drawings are usable not only in the respectively specified combination but also in other combinations or on their own, without departing from the scope of the disclosure.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1:
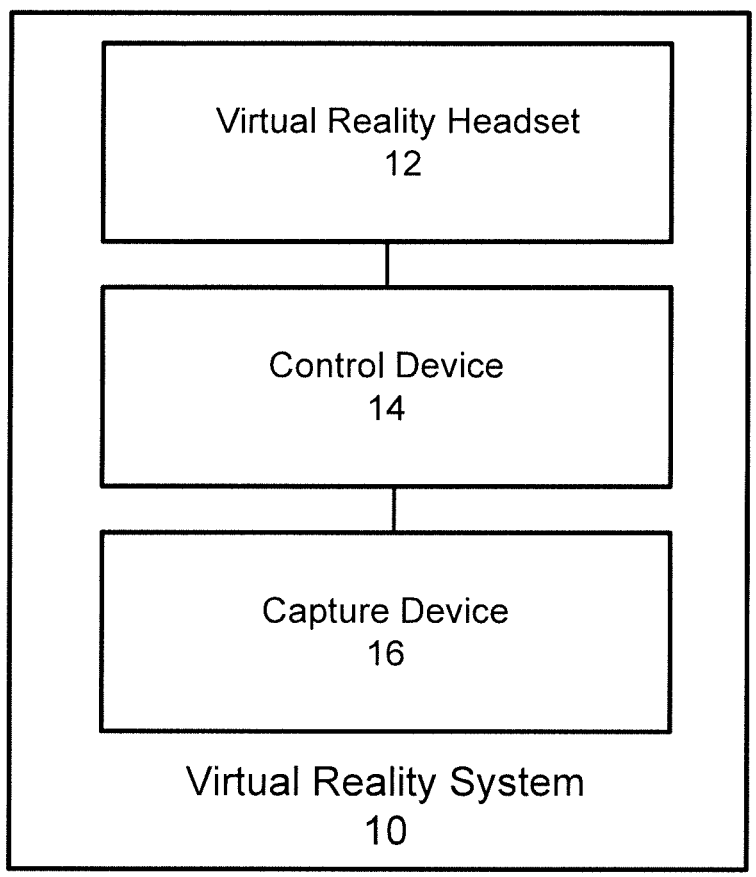
FIG. 1 is a schematic illustration of a virtual reality system having a virtual reality headset for displaying a virtual motor vehicle.

Reference will now be made in detail to the example embodiments with reference to the accompanying drawings, wherein equivalent or functionally equivalent elements are provided with the same reference characters in the drawings.

A virtual reality system, denoted by 10 overall, is shown in a schematic illustration in FIG. 1. The virtual reality system 10 may include a virtual reality headset 12, a control device 14 and a capture device 16. A wide range of vehicle models in the form of displayed virtual motor vehicles can be displayed by using the virtual reality headset 12, both in an interior view and in an exterior view. Here, the control device 14 serves to actuate the virtual reality headset 12. The capture device 16 is designed to determine a position of the virtual reality headset 12, with the control device 14 being configured to predetermine a virtual observation position from which the respective virtual motor vehicle is displayed, corresponding to the currently captured position of the virtual reality headset 12. In particular, the capture device 16 is designed to ascertain a height position of the virtual reality headset 12.

Figure 2:
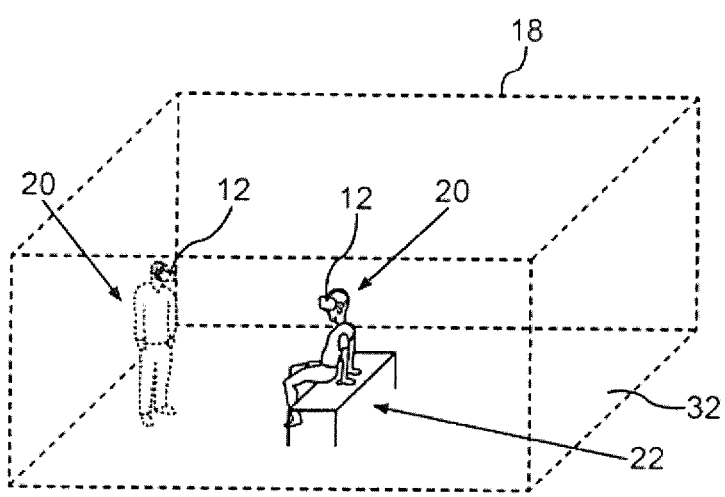
FIG. 2 is a schematic illustration of a capture space, in which a person wearing the virtual reality headset is depicted once seated and once standing.

FIG. 2 shows a capture space 18 in a schematic perspective view, with a person 20, who is wearing the virtual reality headset 12, being illustrated once as standing and once as seated on the seat device 22. The capture device 16 can reliably determine the position of the virtual reality headset 12, and hence also the position and changes in position of the person 20, for as long as the person 20 is situated within the capture space 18. Thus, the person 20 can wander around within the capture space 18, for example, while a virtual motor vehicle is displayed by using the virtual reality headset 12 in order to virtually walk around the displayed virtual motor vehicle and observe the latter from a wide variety of virtual observation positions. However, the person 20 can equally sit down in the seat device 22 in order to look at the virtual motor vehicle, which is displayed by using the virtual reality headset 12, while sitting comfortably on the seat device 22.

Figure 3:
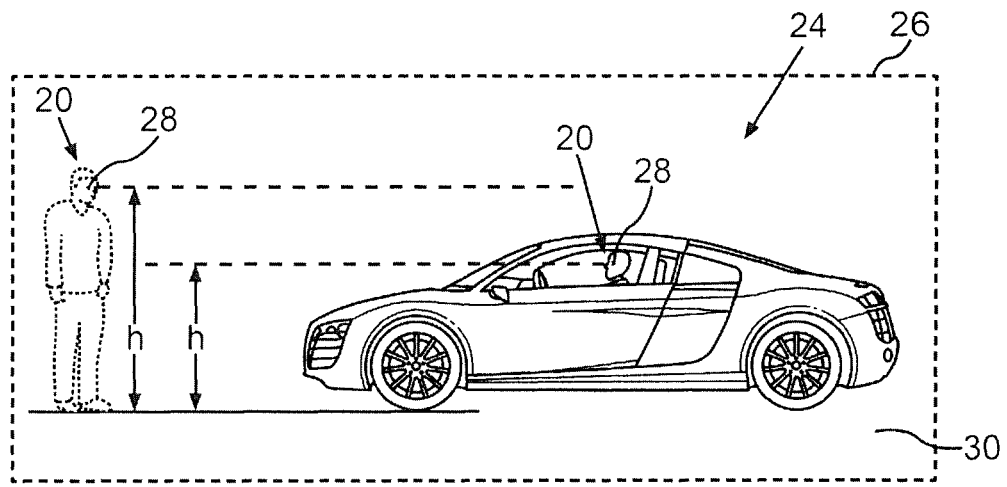
FIG. 3 is an illustration of a virtual motor vehicle in the form of a sports car which is displayed by using the virtual reality headset worn by the person.

FIG. 3 illustrates a virtual motor vehicle 24, which is displayed by using the virtual reality headset 12. Here, the virtual motor vehicle 24 is arranged in virtual surroundings 26, which are likewise displayed by using the virtual reality headset 12. By way of example, the virtual surroundings 26 can be a virtual showroom or the like. The person 20, who is wearing the virtual reality headset 12, is only depicted for illustrative purposes in FIG. 3. As can be seen, the person 20 in one instance sits virtually in the interior of the virtual motor vehicle 24 and, in another instance, stands outside of the virtual motor vehicle 24. A respective virtual observation position 28, from which the person 20 looks at the virtual motor vehicle 24 through the virtual reality headset 12, is labeled schematically in FIG. 3.

Should the virtual motor vehicle 24 be displayed in an interior view by using the virtual reality headset 12, a height h of the virtual observation position 28 is predetermined depending on a height position of the virtual reality headset 12, captured by using the capture device 16, and depending on the model of the currently displayed virtual motor vehicle 24. Since the displayed virtual motor vehicle 24 is a very low sports car in the presently shown case, the person 20 sits virtually very low in the virtual motor vehicle 24. The real seating area 22, on which the person 20 has sat down, is higher in this case than the vehicle seat of the virtual motor vehicle 24 embodied as a sports car.

In order nevertheless to design the virtual seat height particularly realistically when displaying the virtual motor vehicle 24 from an interior view, a height offset between the real seated position and the virtual seated position is taken into account when predetermining the height of the virtual observation position 28. The value for the height offset is predetermined by virtue of forming a difference between a height value of the vehicle seat of the displayed virtual motor vehicle 24 and a height value of the real seating area 22, on which the person 20 is sat. To this end, it is possible to save values for the respective height positions of the seating surfaces of the real seating area 22 and of the virtual vehicle seat, for example. By way of example, if the eyes of the person 20 are at a height of 1.20 m in reality, when the person sits on the seating area 22, the height h of the virtual observation position 28 can be selected to be much lower, for example at a height of only 90 cm if the person 20 sits virtually in the interior of the virtual motor vehicle 24. If the person 20 bends downward in reality, they likewise bend down by the same distance seated in the virtual motor vehicle 24. Here, the observation position 28 only has the height offset for the real eye position of the person 20.

Since the height h of the virtual observation position 28 is adapted to the relevant vehicle model for as long as the virtual motor vehicle 24 is displayed in the interior view by using the virtual reality headset 12, a virtual ground area 30 of the virtual surroundings 26 is also situated closer to the virtual observation position 28 than a real ground area 32 is spaced apart from the eyes of the person 20. If the person 20 pivots their head while they are virtually sat in the virtual vehicle 24, they can peer out of a side window of the virtual motor vehicle 24, for example, with the virtual ground 30 being displayed at a distance corresponding to the height h of the person 20.

As soon as the person 20 is captured rising from the seating area 22, provision can be made for the virtual reality headset 12 to be automatically actuated in such a way that the virtual motor vehicle 24 is no longer displayed in the interior view but, instead, in an exterior view such that the person 20 stands virtually in front of the virtual motor vehicle 24, as indicated in FIG. 3 for example. As soon as the virtual motor vehicle 24 is displayed in the exterior view, the height h of the virtual observation position 28 is still only selected depending on the real height position of the virtual reality headset 12. By way of example, if the person 20 is 1.80 m tall, they peer through the virtual reality headset 12 onto the displayed virtual motor vehicle 24 in the exterior view from a corresponding height onto the virtual motor vehicle as if they were standing in front of the virtual motor vehicle 24 in reality. Thus, in the exterior presentation of the virtual motor vehicle 24, the height h of the virtual observation position 28 still only depends on how high the virtual reality headset 12 worn by the person 20 is currently arranged in reality.

As soon as the person 20 sits back down on the real seating area 22, provision can be made for the virtual reality headset 12 to be automatically actuated such that, once again, a change is undertaken from the exterior view to the interior view. However, provision can alternatively also made for the change back to the interior view only to be carried out once the person 20 has carried out a certain predetermined confirmation action as well, for example the actuation of a remote control or the like. In the latter case, the person 20 can thus sit down on the seating area 22, with the virtual motor vehicle 24 then still being depicted in the exterior view until the person 20 has carried out the predetermined confirmation action. By way of example, a seat occupancy sensor system can be arranged in the seating area 22 in order to capture whether the person 20 is sat on the seating area 22.

Figure 4:
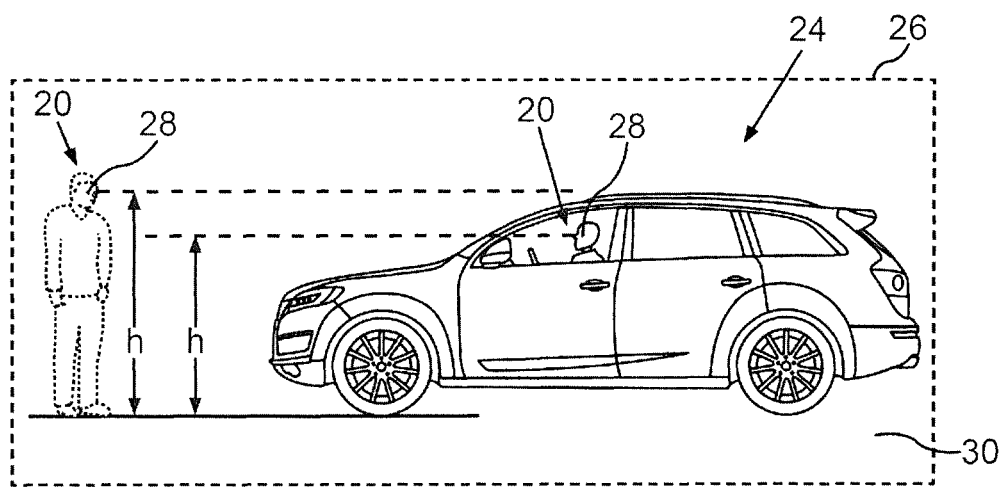
FIG. 4 is an illustration of a further virtual motor vehicle which is displayed by using the virtual reality headset worn by the person, with this virtual motor vehicle being an all-terrain vehicle.

FIG. 4 depicts a further virtual motor vehicle 32, which is displayed by using the virtual reality headset 12. This virtual motor vehicle 32 is an all-terrain vehicle. It is possible to see that the person 20 sits virtually at a substantially greater height in the virtual motor vehicle 32 that is embodied as an all-terrain vehicle than in the virtual motor vehicle 24 shown in FIG. 3, which is a flat sports car. In turn, this is obtained by virtue of the height h of the virtual observation position 28 being predetermined both depending on the height position, captured by using the capture device 16, of the virtual reality headset 12 and depending on the vehicle model of the displayed virtual motor vehicle 32 for as long as the virtual motor vehicle 32 is shown in the interior view. In the case of the virtual motor vehicle 32 being embodied as an all-terrain vehicle, the height h of the virtual observation position 28 is arranged further up by precisely the amount that the seating surface of the virtual motor vehicle 32 is arranged higher than the seating surface of the virtual motor vehicle 24.

As soon as the virtual motor vehicle 32 is displayed in the exterior view, the height h of the virtual observation position 28 once again still only depends on how high the virtual reality headset 12 is arranged in reality. In the exterior view, the person 20 peers onto the virtual motor vehicles 24, 32 from the same height h, both when the virtual motor vehicle 24 and when the virtual motor vehicle 32 is displayed.

A description has been provided with reference to various embodiments and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating a virtual reality system, in which a virtual motor vehicle is displayed from a virtual observation position by using a virtual reality headset worn by a person, the method comprising:
    displaying an interior view of the virtual motor vehicle at a first predetermined height of the virtual observation position, the first predetermined height being determined based on a height position of the virtual reality headset, detected by a capture device, and based on a vehicle model of the virtual motor vehicle;
    displaying the interior view of the virtual motor vehicle for as long as the capture device detects the person sitting in a seating area, and switching, by the virtual reality headset, from displaying the interior view of the virtual motor vehicle to displaying an exterior view of the virtual motor vehicle when the capture device no longer detects the person sitting in the seating area; and
    displaying the exterior view of the virtual motor vehicle at a second predetermined height of the virtual observation position, the second predetermined height being determined based on the height position of the virtual reality headset detected by the capture device and independently of the vehicle model of the virtual motor vehicle.

2. The method as claimed in claim 1, wherein the first predetermined height of the virtual observation position is determined according to a height offset value associated with the vehicle model of the virtual motor vehicle summed together with the height position of the virtual reality headset detected by the capture device.

3. The method as claimed in claim 2, wherein the height offset value is determined based on a difference between a height value of a seat of the virtual motor vehicle and a height value of the seating area.

4. The method as claimed in claim 1, further comprising switching, by the virtual reality headset, from displaying the exterior view of the virtual motor vehicle to displaying the interior view of the virtual motor vehicle when the capture device detects the person sitting in the seating area.

5. The method as claimed in claim 1, further comprising switching, by the virtual reality headset, from displaying the exterior view of the virtual motor vehicle to displaying the interior view of the virtual motor vehicle when the capture device detects the person sitting in the seating area and a predetermined confirmation action by the person has been received.

6. The method as claimed in claim 5, wherein the predetermined confirmation action includes an input to a remote control after the person is seated in the seating area.

7. The method as claimed in claim 1, further comprising:
    detecting, by a seat occupancy sensor system arranged at or in the seating area, whether the person is sitting in the seating area; and
    displaying the interior view or the exterior view of the virtual motor vehicle based on the detecting by the seat occupancy sensor.

8. The method as claimed in claim 1, wherein
    a first vehicle model of the virtual motor vehicle has a first ride position,
    a second vehicle model of the virtual motor vehicle has a second ride position, the second ride position having a greater height than the first ride position relative to ground, and
    the first predetermined height corresponding to the first vehicle model is less than the first predetermined height corresponding to the second vehicle model.

9. The method as claimed in claim 1, further comprising automatically changing the first predetermined height of the virtual observation position in response to changing the displaying the interior view of the virtual motor vehicle to displaying an interior view of another virtual motor vehicle.

10. The method as claimed in claim 1, further comprising:
storing, in at least one memory, a plurality of height values corresponding to different vehicle seats of different vehicle models;
storing, in the at least one memory, at least one height value of the seating area;
determining a height offset based on a difference between a height value among the plurality of height values and a height value of the seating area; and
determining the first predetermined height of the virtual observation position based on the height position of the virtual reality headset and the height offset.

11. A virtual reality system, comprising:
a virtual reality headset having a screen to display a virtual environment in which a virtual motor vehicle is displayed from a virtual observation position;
a capture device to detect a height position of the virtual reality headset; and
a controller configured to actuate the virtual reality headset to:
display an interior view of the virtual motor vehicle at a first predetermined height of the virtual observation position, the first predetermined height being determined based on the height position of the virtual reality headset detected by the capture device, and based on a vehicle model of the virtual motor vehicle,
display the interior view of the virtual motor vehicle for as long as the capture device detects a person wearing the virtual reality headset sitting in a seating area, and to cause the virtual reality headset to switch from displaying the interior view of the virtual motor vehicle to display an exterior view of the virtual motor vehicle when the capture device no longer detects the person sitting in the seating area, and
display the exterior view of the virtual motor vehicle at a second predetermined height of the virtual observation position, the second predetermined height being determined based on the height position of the virtual reality headset detected by the capture device and independently of the vehicle model of the virtual motor vehicle.

12. The virtual reality system as claimed in claim 11, wherein the controller is configured to determine the first predetermined height of the virtual observation position according to a height offset value associated with the vehicle model of the virtual motor vehicle summed together with the height position of the virtual reality headset detected by the capture device.

13. The virtual reality system as claimed in claim 12, wherein the controller is configured to determine the height offset value based on a difference between a height value of a seat of the virtual motor vehicle and a height value of the seating area.

14. The virtual reality system as claimed in claim 11, wherein the controller is configured to actuate the virtual reality headset to switch from displaying the exterior view of the virtual motor vehicle to displaying the interior view of the virtual motor vehicle when the capture device detects the person sitting in the seating area and a predetermined confirmation action by the person has been received.

15. The virtual reality system as claimed in claim 14, further comprising a remote control to receive an input corresponding to the predetermined confirmation action, and the controller is configured to actuate the virtual reality headset to switch from displaying the exterior view of the virtual motor vehicle to displaying the interior view of the virtual motor vehicle when the capture device detects the person sitting in the seating area and the remote control receives the input corresponding to the predetermined confirmation action after the person is seated in the seating area.

16. The virtual reality system as claimed in claim 11, further comprising:
a seat occupancy sensor system arranged at or in the seating area, configured to detect whether the person is sitting in the seating area, and
wherein the controller is configured to actuate the virtual reality headset to display the interior view or the exterior view of the virtual motor vehicle based on the detection by the seat occupancy sensor of whether the person is sitting in the seating area.

17. The virtual reality system as claimed in claim 11, wherein
a first vehicle model of the virtual motor vehicle has a first ride position,
a second vehicle model of the virtual motor vehicle has a second ride position, the second ride position having a greater height than the first ride position relative to ground, and
the first predetermined height corresponding to the first vehicle model is less than the first predetermined height corresponding to the second vehicle model.

18. The virtual reality system as claimed in claim 11, wherein the controller is configured to automatically change the first predetermined height of the virtual observation position in response to the virtual reality headset changing the displaying the interior view of the virtual motor vehicle to displaying an interior view of another virtual motor vehicle.

19. The virtual reality system as claimed in claim 11, further comprising:
at least one memory to store a plurality of height values corresponding to different vehicle seats of different vehicle models and at least one height value of the seating area,
wherein the controller is configured to determine a height offset based on a difference between a height value among the plurality of height values and a height value of the seating area, and to determine the first predetermined height of the virtual observation position based on the height position of the virtual reality headset and the height offset.

20. A virtual reality system, comprising:
a virtual reality headset, wearable on a head of a person, having a screen to display a virtual environment in which a virtual motor vehicle is displayed from a virtual observation position;
a capture device to detect, within a predefined capture space, a height position of the virtual reality headset with respect to a ground plane of the predefined capture space;
a seat occupancy sensor system arranged at or in a seat provided within the predefined capture space, configured to detect whether the person is sitting in the seat; and
a controller configured to actuate the virtual reality headset to:
display one of an interior view of the virtual motor vehicle and an exterior view of the virtual motor vehicle, based on the detection by the seat occupancy sensor of whether the person is sitting in the seat, when the seat occupancy sensor detects the person is sitting in the seat, display the interior view of the virtual motor vehicle at a first predetermined height of the virtual observation position, the first predetermined height being determined based on the height position of the virtual reality headset detected by the capture device, and based on a vehicle model of the virtual motor vehicle, and when the seat occupancy sensor detects the person is not sitting in the seat, display the exterior view of the virtual motor vehicle at a second predetermined height of the virtual observation position, the second predetermined height being determined based on the height position of the virtual reality headset detected by the capture device and independently of the vehicle model of the virtual motor vehicle.

* * * * *